United States Patent Office 3,775,368
Patented Nov. 27, 1973

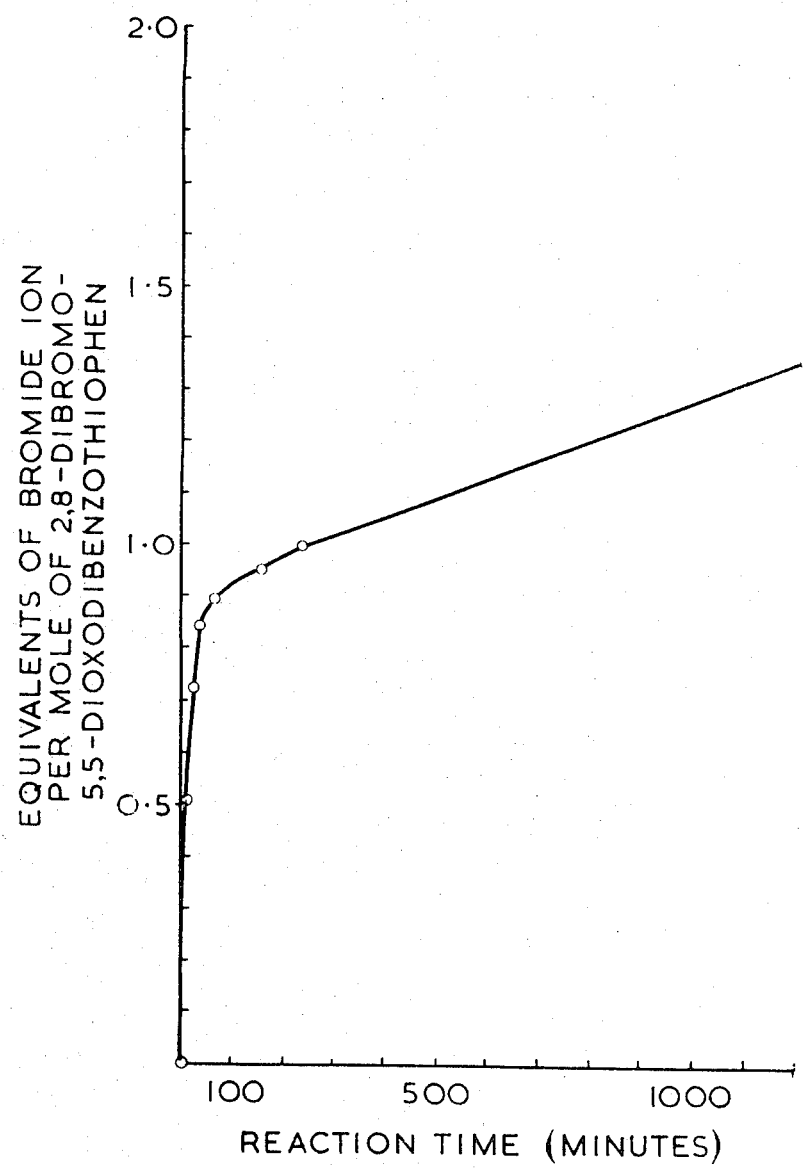

3,775,368
AROMATIC POLYMERS OF 2-BROMO-8-HYDROXY-5,5-DIOXODIBENZOTHIOPHEN
Victor Jeffrey Leslie, Potters Bar, Alan Branford Newton, London, and John Brewster Rose, Letchworth, England, assignors to Imperial Chemical Industries Limited, London, England
Continuation-in-part of application Ser. No. 56,405, July 20, 1970. This application Jan. 31, 1972, Ser. No. 222,030
Claims priority, application Great Britain, July 31, 1969, 38,440/69
Int. Cl. C08g 23/00
U.S. Cl. 260—49   4 Claims

ABSTRACT OF THE DISCLOSURE

New aromatic polymers comprising units of the formula

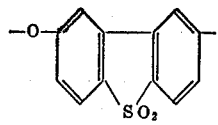

and copolymers comprising such units and other units such as

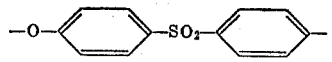

are of higher softening point than polymers of the latter units alone. The new polymers may be made using an alkali metal salt of 2-bromo-8-hydroxy-5,5-dioxodibenzothiophen as monomer or by reacting 2,8-dibromo-5,5-dioxodibenzothiophen with an equivalent amount of an alkali metal hydroxide or a di-(alkali metal) salt of a bisphenol.

---

This application is a continuation-in-part of our application 56,405 filed on July 20, 1970, now abandoned.

This invention relates to new aromatic polymers and to new chemical intermediates from which they may be produced.

In the specifications of British Pats. 1,153,035, 1,153,528 and 1,234,301, the disclosures of which are incorporated herein by reference, there are described methods for the production of aromatic polymers in which a dihalobenzenoid compound having each halogen atom activated by an electron-attracting group is caused to react with a substantially equivalent amount of an alkali metal hydroxide. As explained in British Pat. 1,153,035, the halogen atoms in the dihalogenobenzenoid compound are preferably chlorine or fluorine. The fluorine derivatives generally are more reactive and enable the displacement of alkali metal halide to be carried out more quickly, but are more expensive. Bromine derivatives are also relatively expensive and although they resemble the chlorine derivatives in performance, they would seem to offer no advantages. Iodine derivatives are generally less suitable.

Any dihalogenobenzenoid compound or mixture of dihalogenobenzenoid compounds is suitable, provided the two halogen atoms are linked to benzene rings which have an electron-attracting group, preferably ortho or para to the halogen atom. The dihalogenobenzenoid compound can have the halogen atoms linked to the same benzenoid ring or to different benzenoid rings, so long as each is activated by an electron-attracting group.

Any electron-attracting group inert under the conditions of the reaction can be used as the activating group in these compounds. The more powerful electron-attracting groups give the highest reaction rates and are therefore preferred. Electron-donating groups should be absent from the same benzenoid ring as the halogen. It may be a univalent group that activates one or more halogen atoms in the same ring, for example a nitro, phenylsulphonyl, alkylsulphonyl, cyano, trifluoromethyl or nitroso group, or heteronitrogen as in pyridine; or it may be a bivalent group that can activate halogen atoms in two different rings, for example a sulphone, sulphoxide, azo, carbonyl, vinylene, vinylidene, tetrafluoroethylene or organic phosphine oxide group; or it may be a bivalent group that can activate halogen atoms on the same ring, as in the case of difluorobenzoquinone and 1,4-, 1,5- or 1,8-difluoroanthraquinone.

In particular, the dihalogenobenzenoid compound may have the formula

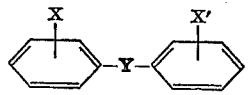

in which X and X' are conveniently the same but may be different and are halogen atoms, and Y is —SO$_2$—, —SO— or —CO— or a radical of the formula

in which Y' and Y" may be the same or different and each is —SO$_2$—, —SO— or —CO— and A is a bivalent organic radical, which may be aliphatic, aromatic or heterocyclic and has both valencies linked to carbon atoms. For example, A may be a bivalent aromatic radical derived from benzene, a fused-ring aromatic hydrocarbon containing not more than two aromatic rings (for example naphthalene, indene, fluorene or dibenzofuran), or a compound of the formula

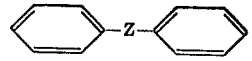

in which Z is a direct link, —O—, —S—, —SO$_2$—, —CO—, a bivalent hydrocarbon or substituted hydrocarbon radical (e.g. alkylene, alkylidene or a bivalent cycloaliphatic or aromatic radical), or a residue of an organic diol (i.e. the bivalent radical obtained by removing the hydrogen atoms from the two hydroxy groups). The halogen atoms in the dihalogenobenzenoid compounds are preferably in the para position to the bridging group Y, because the essentially all-para polymers that can be made from them have better physical properties as thermoplastic materials.

Lower alkyl, alkoxy or alkylthio groups may be present as substituents on any of the aromatic rings but are preferably absent from the halogen-bearing rings and are also preferably absent altogether when the aromatic polymer is required to be stable at high temperatures.

The dihalobenzenoid compound may, in particular, have the formula

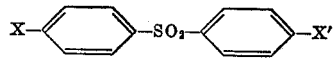

or

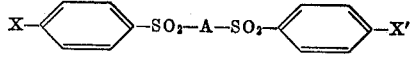

where X and X' are halogen atoms (preferably chlorine or fluorine) and A is a bivalent aromatic radical of, for example, benzene, biphenyl, terphenyls or a fused-ring aromatic hydrocarbon containing not more than three aromatic rings (for example naphthalene, indene, fluorene or dibenzofuran). Also described therein and in British specification 1,177,183 (the disclosure of which is incorporated herein by reference) is the production of aromatic polymers whose molecular chains comprise units of the formula

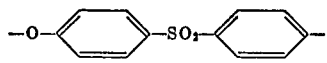

in which an alkali metal salt of a halophenol of the formula

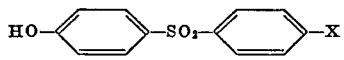

(where X is halogen) is polymerised by the displacement of alkali metal halide.

British specification 1,177,183 describes polymers having recurring units of the formula —O—E— in which E is the residuum of a halophenol, i.e. the bivalent aromatic residue of the compound after removal of the halogen atom and aromatic hydroxyl group from the halophenol. Any halophenol may be used provided that the halogen atom is bonded to a benzene ring having an electron-attracting group in at least one of the positions ortho or para to the halogen atom. The halophenol can be either mononuclear where the halogen atom and hydroxyl group are attached to the same benzene ring or polynuclear where they are attached to different benzene rings, provided that there is the electron attracting group in the ortho or para position of the benzene ring containing the halogen atom.

Any electron-attracting group can be employed as the activator group in the halophenols. It should be, of course inert to the reaction, but otherwise its structure is not critical. Preferred are the strong activating groups for example the sulphone group (—SO$_2$—) bonding two benzene rings as in 4-(4-chlorophenyl-sulphonyl)phenol and 4-(4-fluorophenylsulphonyl)phenol, although such other strong attracting groups hereinafter mentioned can also be used.

The more powerful of the electron-attracting groups give the fastest reactions and hence are preferred. It is further preferred that the ring contains no electron supplying groups on the same benzene ring as the halogen; however, the presence of other groups on the ring or in the residuum of the halophenol can be tolerated. Preferably, all of the substituents on the halophenol residuum are either hydrogen (zero electron-attracting), or other groups having a positive sigma* value, as set forth in J. F. Bunnett in Chem. Rev., 49, 273 (1951) and Quart. rev., 12, 1 (1958).

The electron-attracting group of the halophenol compound can function either through the resonance of the aromatic ring, as indicated by those groups having a high sigma* value, i.e. above about +0.7 or by induction as in perfluoro compounds and other electron sinks.

Preferably, the activating group should have a high sigma* value, preferably above 1.0, although sufficient activity to promote the reaction is evidenced in those groups having a sigma* value above 0.7, although the reaction rate with such a low powered electron-attracting group may be somewhat low.

The activitating group can be basically either of two types:

(a) Monovalent groups that activate displacement of a halogen on the same ring as the aromatic hydroxy group for example a nitro group, phenylsulphone, phenylcarbonyl, alkylsulphone, cyano, trifluoromethyl, nitroso and hetero nitrogen as in pyridine, (b) Divalent groups that activate displacement of a halogen on a ring joined by the divalent group to a ring having the aromatic hydroxyl group, for example the sulphone group —SO$_2$—; the carbonyl group —CO—; the vinyl group —CH=CH—; the sulphoxide group —SO—; the azo-group —N=N—; the saturated fluorocarbon groups —CF$_2$CF$_2$—; organic phosphine oxides ǂPO(R")ǂ, where R" is a hydrocarbon and the ethylidene group ǂC(CX$_2$)ǂ were X can be hydrogen or halogen, or divalent groups which can activate a halogen on the same ring as the aromatic hydroxyl group for example difluorobenzoquinone, 1,4- or 1,5- or 1,8-difluoroanthraquinone.

If desired, the polymers may be made with mixtures of two or more halophenols having substantially the same reactivities which may have different or the same electron-attracting groups. Thus the E residuum of the halophenols in the polymer structure may be the same or different.

In British specifications 1,078,234 and 1,133,561 (the disclosures of which are included hereinby reference), there is disclosed a method for the production of aromatic polymers having recurring units of the formula

—O—E′—O—E°— in which a dihalobenzenoid compound having each halogen atom activated by an electron-attracting group (as described above) is caused to react with a di(alkali metal) salt of a dihydric phenol in the liquid phase of an inert highly polar organic solvent. In this formula E′ is thus the residue of the dihydric phenol and E° is the residue of the dihalobenzenoid compound. The dihalobenzenoid compound may in particular have the formula

(where X is halogen, preferably chlorine or fluorine) and the dihydric phenol may in particular be one of the following:

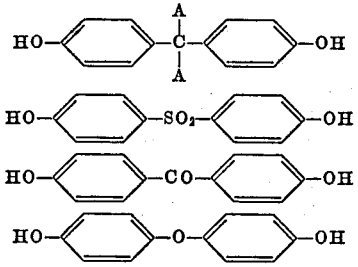

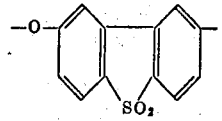

(where the A group represents hydrogen, lower alkyl, lower aryl and the halogen-substituted groups thereof).

According to the present invention there are provided new aromatic polymers whose molecular chains comprise units of the formula

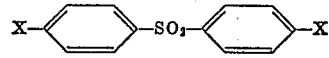

either alone or copolymerised with other units, and with units of the formula —R—E— and/or units of the formula —R—E′—R—E° in which formulae R is oxygen or sulphur and E, E′ and E° are as defined above, in particular units of the formula

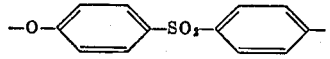

Polymers containing a substantial proportion of units of the former formula (e.g., 10 of the former units for 90 of the latter in the polymer) are of higher softening point than equivalent polymers having units of the latter formula alone, and a useful modification of the properties of the latter polymer may be obtained by the presence of as little as 1 of the former units for 99 of the latter in the polymer. Polymers containing units of the former formula are of higher softening point than equavalent polymers having units of the latter formula alone.

According to the invention there are also provided as new chemical intermediates 2-bromo-8-hydroxy-5,5-dioxodibenzothiophen and the alkali metal salts thereof.

Of these compounds, 2-bromo-8-hydroxy-5,5-dioxodibenzothiophen, possessing a reactive bromine atom as well as a phenolic group, can serve as a valuable chemical intermediate for producing a variety of products; for example the bromine atom can be replaced by amino and substituted amino groups or by oxygen- or sulphur-containing anions to produce amines, ethers and sulphides.

The alkali metal salts of this bromophenol can be polymerised to give the new polymers of the invention.

This bromophenol and its alkali metal salts may be prepared by the action of alkali metal hydroxide on 2,8-dibromo - 5,5 - dioxodibenzothiophen in a manner similar to that described for the halfway hydrolysis of bis-(4-chlorophenyl) sulphone in British specification 1,153,035.

The alkali metal salt of the bromophenol is initially obtained dissolved in the reaction medium and is preferably used directly, although for the purpose of purification it may be more convenient in some cases to acidify and then isolate the free bromophenol. This can be converted back into an alkali metal salt by treatment with a suitable base (e.g., an alkali metal hydroxide or alkoxide).

The alkali metal is conveniently potassium or sodium. Displacement of alkali metal halide often occurs more readily if the potassium cation is present in the reagent used, but the weight (and usually the price) per mole of a potassium compound is higher than for the corresponding sodium compound. Some or all of the alkali metal cation in the reagent may be replaced by an organic onium cation having a positively charged heteroatom (for example a quaternary ammonium cation such as tetramethyl ammonium) stable under the conditions of the reaction, and the term "alkali metal salt" as used herein is deemed to refer also to salts containing such onium cations.

Further according to the invention, there is provided a method for making new aromatic polymers having units of the formula

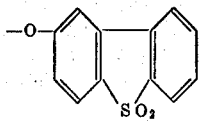

in which an alkali metal salt of 2-bromo-8-hydroxy-5,5-dioxodibenzothiophen, or a mixture of 2,8-dibromo-5,5-dioxodibenzothiophen and an equivalent amount of an alkali metal hydroxide or of the di-(alkali metal) salt of a dihydric phenol is polymerised at 150–400° C. by the displacement of alkali metal halide. These reagents may be polymerised alone, or they may be copolymerised with alkali metal salts of other activated halophenols (or with mixtures of activated dihalobenzenoid compounds and an equivalent amount of alkali metal hydroxide), in particular those described in British specifications 1,153,035 and 1,177,183; or they may be copolymerised with mixtures of di-(alkali metal) salts of dihydric phenols and activated dihalobenzenoid compounds as described in British specifications 1,078,234 and 1,133,561. The halogen atoms in the halophenol or dihalobenzenoid compound are activated by electron-attracting groups such as —$SO_2$— ortho or para to the halogen atom. The comonomer may for example be an alkali metal salt of a 4-(4-halophenylsulphonyl)phenol or a mixture of a bis-(4-halophenyl) sulphone with an equivalent amount of alkali metal hydroxide. The halogen atoms in the comonomer are preferably chlorine (for cheapness) or fluorine (for greater reactivity), although the bromide derivatives may also be used.

In a further embodimnet of the invention, block copolymers may be formed by polymerizing an alkali metal those having repeating units

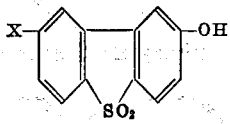

in the presence of preformed polymers comprising benzenoid groups and oxygen or sulphur atoms in the polymer chain, with bivalent electron-attracting groups such as —$SO_2$— or —CO— also in the polymer chain separated from an oxygen or sulphur atom by a para or ortho phenylene group, such as for example those described in British specifications 1,078,234 and 1,153,035 and U.S. specification 3,432,468. Preferred preformed polymers are are those having repeating units

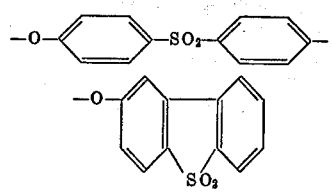

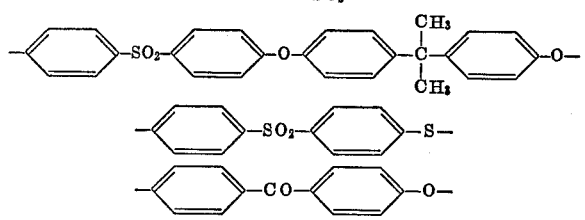

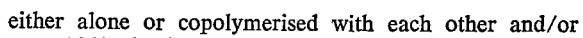

either alone or copolymerised with each other and/or up to 80% of units having the formula

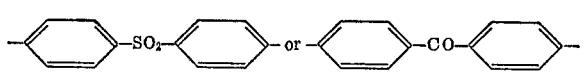

where the halogen atoms are preferably chlorine or fluorine. The fluorine derivatives generally are more reactive and enable the displacement of alkali metal halide to be carried out more quickly or at a lower temperature, but are more expensive. Bromine derivatives are also relatively expensive and although they resemble the chlorine derivatives in performance they offer no advantages. Iodine derivatives are generally less suitable.

The alkali metal is conveniently potassium or sodium. Displacement of alkali metal halide often occurs more readily if the potassium cation is present in the reagent used, but the weight (and usually the price) per mole of a potassium compound is higher than for the corresponding sodium compound. Some or all of the alkali metal cation in the reagent may be replaced by an organic onium cation having a positively charged hetero-atom (for example a quaternary ammonium cation such as tetramethyl-ammonium) stable under the conditions of the reaction, and the term "alkali metal salt" as used herein is deemed to refer also to salts containing such onium cations.

The polymerisation is preferably carried out in a polar liquid which is a solvent for alkali metal phenoxides and is stable under the reaction conditions employed, although an alkali metal salt of 2-bromo-8-hydroxy-5,5-dioxodibenzothiophen may also be polymerised or copolymerised with another alkali metal salt of a halophenol in the melt.

Suitable polar liquids for the reaction include the lower dialkyl and cyclic alkylene sulphoxides and sulphones (e.g. dimethyl sulphoxide and 1,1-dioxothiolan, aromatic nitriles (e.g. benzonitrile) and diaryl ketones (e.g. benzophenone), sulphoxides and sulphones. The total amount of solvent used is desirably sufficient to ensure that none of the starting materials is in the solid state in the reaction mixture.

Changing the liquid reaction medium may be convenient as it allows the initial use of liquids that would be less suitable for the final stages, being for example inconveniently volatile or unstable at polymerization temperatures or incapable of dissolving the resultant polymer to the desired extent. For example, dimethyl sulphoxide is a convenient solvent, especially for the hydrolysis of 2,8-dibromo-5,5-dioxodibenzothiophen with alkali metal hydroxide, but it cannot be used at such high temperatures as 1,1-dioxothiolan (cyclic tetramethylene sulphone).

The liquid reaction medium need not contain any solvents for polymer of high molecular weight even at the later stages of the reaction, although if it does not the product is of relatively low molecular weight unless the final stage of polymerisation is carried out in the melt; this may be explained if the molecular chains of the polymer cease to grow in the solid state.

The rate of polymer formation in the reaction of the invention rises with rise of temperature and below 200° C. is usually uneconomically slow. It may, however, be advantageous to preheat the reaction mixture between 150 C. and 200° C. and then raise the temperature to produce the polymer. Temperatures up to 400° C. may be employed, and about 250° C. is usually convenient.

The reaction should initially be carried out under pressure if necessary to prevent the escape of 2,8-dibromo-5,5-diaxodibenzothiophen or other dihalobenzoid compound and any volatile solvent or cosolvent. Heating in vacuum may however be desirable at a later stage to remove unwanted solvents, e.g. dimethyl sulphoxide which may decompose at the temperatures required to produce high polymer.

The vessel used should be made of or lined with a material that is inert to alkali metal phenoxides and also to alkali metal halides under the conditions employed. For example, glass is unsuitable as it tends to react with phenoxide anions at high temperatures, upsetting the stoichiometry of the polymerisation and contaminating the product with silicate. Some grades of stainless steel undergo surface crazing at these temperatures in the presence of alkali metal halide, and vessels made of or lined with titanium or nickel or an alloy thereof or some similarly inert material are preferable.

The polymerisation may conveniently be carried out in an extruder or on a heated metal band.

To neutralise any reactive oxygen- or sulphur-containing anions, a reagent therefor may be introduced at the termination of the polymerisation. Reactive monofunctional haldies, for example methyl chloride, are particularly suitable.

The alkali metal halide can be removed from the resultant high polymer by any suitable means. For example, it can be extracted from the high polymer using water, or the polymer itself can be dissolved in a strongly polar organic solvent (for example dimethyl formamide, 1-methyl-2-oxopyrrolidine, dimethyl sulphoxide, 1,1-dioxothiolan or nitrobenzene) and then reprecipitated by addition to a liquid such as water which is miscible with the polymer solvent but itself is a non-solvent for the polymer.

When the polymer is formed in solution, a convenient procedure is to add the reaction mixture (which may be decanted or filtered from solid alkali metal halide) to an excess of a liquid which is miscible with the reaction solvent but in which the polymer is insoluble. If the reaction solvent is water-miscible, or is miscible with a liquid in which residual alkali metal halide also dissolves, the polymer can thus be obtained in one step. Otherwise, as for example if the reaction mixture is poured into methanol, the precipitated polymer initially contains alkali metal halide which can subsequently be washed out with water.

The reduced viscosity of the polymers of the invention is desirably at least 0.3 (measured at 25° C. at 1% w./v. in a solvent such as dimethyl formamide) if they are to serve for structural purposes as a thermoplastic. In general, the new thermoplastic polymers of this invention may be used in any of the ways described for similar thermoplastic aromatic polysulphones in British specification 1,016,245.

The following examples illustrate the invention.

EXAMPLE 1

A solution of 2,8-dibromo-5,5-dioxodibenzothiophen (3.7408 g.; 0.010 mole) and dimethyl sulphoxide (225 cm.$^3$) was stirred at 120° C.±0.05 deg. C. in a stainless steel vessel under nitrogen. 1.000 N aqueous potassium hydroxide (40 cm.$^3$; 0.040 mole) (preheated to 90° C.) was rapidly added to the solution. This technique ensured that the thermostatically controlled temperature was maintained at the same level during the mixing period. The system was homogeneous; samples were removed periodically and titrated for unused potassium hydroxide, potassium phenates and liberated bromide ion.

The graph on the accompanying drawings shows the amount of bromide ion per mole of 2,8-dibromo-5,5-dioxodibenzothiophen liberated as a function of time. The facile removal of one bromine atom and the less ready removal of the second bromine atom is an obvious conclusion from this graph. The graph also suggests that a small amount of cleavage of the ring system has occurred to produce the dipotassium salt of 3,3'-dibromo-6'-hydroxybiphenyl-6-sulphonic acid, which would not be expected to liberate bromide ions with base.

EXAMPLE 2

A suspension of 2,8-dibromo-5,5-dioxodibenzothiophen (75 g.; 0.202 mole) in dimethyl sulphoxide (500 cm.$^3$) was heated to 110° C. and to the stirred mixture was added dropwise an aqueous solution of potassium hydroxide (46.5 cm.$^3$; 0.404 mole). The mixture was vigorously stirred for 3 hours at 110° C. after the complete addition of the base, then cooled to 50° C. and filtered. The filtrate was poured into water (2 litres), and the aqueous solution was acidified with hydrochloric acid. The colourless precipitate which formed was filtered off, washed twice with water, dried and recrystallised from methanol. The yield was 55 g. and the material melted with decomposition. An analytically pure sample was obtained by recrystallisation from nitrobenzene and had infra-red and nuclear magnetic resonance spectra which were consistent with 8-bromo-2-hydroxy-5,5-dibromodibenzothiophen.

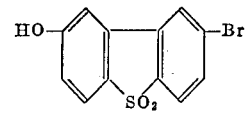

8-bromo-2-hydroxy-5,5 - dioxodibenzothiophen (10.95 g.) was suspended in water (10 cm.$^3$) and a solution of 1 N potassium hydroxide (35.2 cm.$^3$) was added. The mixture was warmed and stirred to 60° C., filtered, and the filtrate was evaporated to dryness to give the potassium salt as a yellow powder. The salt was dried in a vacuum desiccator at 120° C. overnight.

This potasium salt (7 g.) and dimethyl sulphone (10 g.) were heated together under an atmosphere of dry nitrogen at 230° C. for 24 hours. The mixture was then allowed to cool to 150° C. and dimethyl formamide (20 cm.$^3$) was added, and the solution was poured into methanol. The precipitated polymer was washed with hot methanol and hot water and finally dried. The polymer had a reduced viscosity of 0.42 (measured at 25° C. on a 1% w./v. solution in dimethyl formamide, i.e. a solution containing 1 g. of polymer per 100 cm.$^3$ of solution), and infra-red and nuclear magnetic resonance spectra which were consistent with a polymer having repeating units of the structure

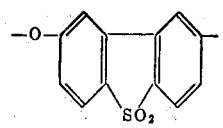

Copolymers containing these units and units of the formula

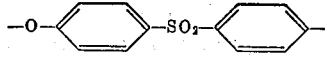

in the ratios 1:1, 1:5 and 1:10 are made by heating together the above potassium salt and the potassium salt of 4-(4-chlorophenylsulphonyl)phenol (using 1,5 and 10 molar proportions respectively) in 1,1-dioxothiolan as solvent.

What is claimed is:

1. An aromatic polymer having a reduced viscosity of at least 0.3 as measured at 25° C. in a solution of the polymer in dimethyl formamide containing 1% w./v. polymer and whose molecular chains consist essentially of units of the formula

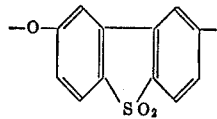

copolymerized with 0 to 99 units, per 100 units in the polymer chain, of units selected from the class consisting of units of the formula

and units of the formula

wherein R is an oxygen or sulphur atom, E is the residuum which can be derived by moving a hydroxy and a halogen from a halophenol having an electron-attracting group having a sigma* value of at least 0.7 in at least one of the positions ortho or para to the halogen atom, E' is the residuum which can be derived by removing two hydroxy groups from a dihydric phenol, and E° is the residuum which can be derived by removal of two halogens from a dihalobenzenoid compound having each halogen atom activated by an electron-attracting group having a sigma* value of at least 0.7.

2. An aromatic polymer according to claim 1 whose molecular chains consist essentially of units of the formula

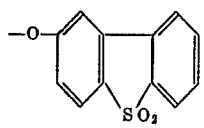

copolymerized with 0 to 90 units, per 100 units in the polymer chain, of the formulae

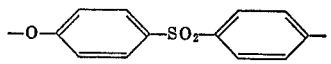

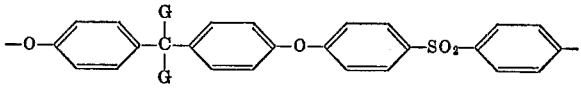

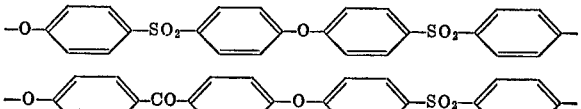

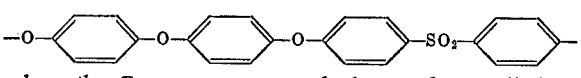

where the G group represents hydrogen, lower alkyl or lower aryl.

3. An aromatic polymer as set forth in claim 1 whose molecular chains consist essentially of units of the formula

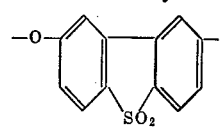

4. An aromatic polymer as set forth in claim 1 whose molecular chains consist essentially of units of the formula

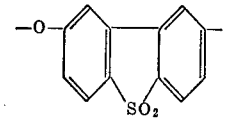

copolymerized with 0 to 90 units, per 100 units in the polymer chain, of the formula

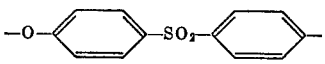

References Cited

UNITED STATES PATENTS

| | | | |
|---|---|---|---|
| 3,370,107 | 2/1968 | Barth | 260—901 |
| 3,228,910 | 1/1966 | Stamatoff | 260—47 |
| 993,735 | 5/1911 | Thomaschewiki | 260—329.3 |
| 3,332,909 | 7/1967 | Franham et al. | 260—47 |
| 3,491,058 | 1/1970 | Taylor et al. | 260—47 |

HAROLD H. ANDERSON, Primary Examiner
L. L. LEE, Assistant Examiner

U.S. Cl. X.R.

260—30.2, 30.8 R, 30.8 DS, 23.4, 32.6 R, 329.3, 823